324-77. SR 07-06-71 XR 3,591,784

United States Patent [11] 3,591,784

[72] Inventors Joseph T. Cutter
Washington, D.C.;
Don G. Freeman, Gaithersburg, Md.;
Richard Van Bierkom, Rockville, Md.

[21] Appl. No. 768,474
[22] Filed Oct. 17, 1968
[45] Patented July 6, 1971
[73] Assignee International Business Machines Corporation
Armonk, N.Y.
Continuation of application Ser. No. 673,881, Oct. 9, 1967, now abandoned.

[54] REAL TIME DIGITAL FOURIER ANALYZER
25 Claims, 13 Drawing Figs.

[52] U.S. Cl. .......... 235/152, 181/.5 F, 235/156, 324/77 G, 340/15.5 DP
[51] Int. Cl. .......... G06f 7/38
[50] Field of Search .......... 235/152, 156, 181; 340/15.5; 181/.5; 324/77 G

[56] References Cited

UNITED STATES PATENTS

| | | | |
|---|---|---|---|
| 3,266,782 | 1/1968 | Bonnet .......... | 235/181 |
| 3,372,269 | 3/1968 | MacSorley et al. .......... | 235/160 |

OTHER REFERENCES

W. T. Cochran, "What is a Fast Fourier Transform'," PROCEEDINGS OF THE IEEE, Vol. 55, No. 10, Oct. 1967, pp. 1664– 1674.

R. S. Shively, "A Digital Processor To Generate Spectra In Real Time," IEEE TRANSACTIONS ON COMPUTERS, Vol. C-17, No. 5, May 1968, pp. 485– 491.

*Primary Examiner*—Malcolm A. Morrison
*Assistant Examiner*—Charles E. Atkinson
*Attorney*—Hanifin and Jancin

ABSTRACT: A real time digital Fourier analyzer utilizing either the Cooley-Tukey or the Danielson-Lanczos algorithms consisting of particularly adapted hardware to facilitate the calculations of said algorithms. Specifically, the preferred embodiment utilizes hardware equally adapted to both algorithms with fixed point arithmetic, a look-ahead two's complementor, and an address generator employing three binary counters.

INVENTORS
JOSEPH T. CUTTER
DON G. FREEMAN
RICHARD VAN BLERKOM

BY James David Jacobo
AGENT

| WRITE ADDRESS A COUNTER 401 | READ ADDRESS C COUNTER 403 | SHIFT REG 413 | NO. OF STEPS COUNTER 409 | REG 405 D-L Wk | REG 505 BACKW'D C-T Wk | RESET PULSES | |
|---|---|---|---|---|---|---|---|
| 0 | 0 | 4 | 0 | 0 | 0 | | INITIALIZE |
| 1 | 1 | 4 | 1 | 0 | 0 | | |
| 2 | 2 | 4 | 2 | 0 | 0 | | |
| 3 | 3 | 4 | 3 | 0 | 0 | | |
| 0 | 0 | 2 | 0 | 0 | 0 | 1 & 2 | RESET 1 MUST OVERRIDE RESET 2 |
| 1 | 1 | 2 | 1 | 0 | 0 | | |
| 2 | 4 | 2 | 0 | 2 | 2 | 2 | |
| 3 | 5 | 2 | 1 | 2 | 2 | | |
| 0 | 0 | 1 | 0 | 0 | 0 | 1 & 2 | RESET 1 MUST OVERRIDE RESET 2 |
| 1 | 2 | 1 | 0 | 1 | 2 | 2 | |
| 2 | 4 | 1 | 0 | 2 | 1 | 2 | |
| 3 | 6 | 1 | 0 | 3 | 3 | 2 | |
| 0 | 0 | 4 | 0 | 0 | 0 | 1 & 2 | INITIALIZED AGAIN |

REAL TIME DIGITAL FOURIER ANALYZER

This application is a continuation of application Ser. No. 673,881, filed Oct. 9, 1967.

BACKGROUND OF THE INVENTION

1. Field of the Invention

This invention relates to apparatus for measuring and testing of electrical waveforms, and more specifically to analysis of complex waves.

2. Description of Prior Art

The prior art has a number of devices specifically adapted for analyzing complex waveforms. However, previous devices have always operated in the analog domain. More recently, a number of algorithms have been derived for obtaining the Fourier transforms of a series of digital samples on digital electronic computers. Reference is made to a technical article in the IEEE Transactions on Audio and Electroacoustics, Vol. Au-15, No. 2, June, 1967, "What is the Fast Fourier Transform?" by W. T. Cochran, et al., and papers referenced therein. The algorithms discussed within this paper are utilized by the invention.

BRIEF SUMMARY OF THE INVENTION

The invention consists of a real time digital Fourier analyzer. As is well known in the art recent developments have resulted in the derivation of a number of algorithms which obtain a Fourier analysis for a set of discrete digital data points. The invention consists of utilizing these recent developments in order to obtain a real time digital Fourier analyzer. The invention is disclosed with two embodiments; each of which utilizes a different algorithm. The algorithms used in the preferred embodiments are known as the Cooley-Tukey and Danielson-Lanczos.

Reference should be made to the above Cochran et al. article for a theoretical discussion of the subject algorithms and their interrelationships with prior mathematical techniques. The invention adapts these algorithms in a hardware embodiment uniquely suited for performing a real time digital Fourier analysis. As explained in the article and further developed below, the Cooley-Tukey (hereinafter referred to as C–T) algorithm results in a scrambled answer. That is, when a conventional storage unit (a memory) is used, the coefficients of the Fourier transform are not arranged in an order of increasing frequencies. However, the C–T algorithm performs an in place operation, i.e. the newly calculated information is placed in the same locations from where the old information was withdrawn; therefore, only $n$ memory locations are necessary where $n$ is the number of coefficients desired. The Danielson-Lanczos (hereinafter referred to as D–L) algorithm produces coefficients in an ordered fashion, but necessitates the use of two $n$ memory locations where $n$ is the number of coefficients.

In most real time applications, computation speed is the primary consideration. Since the D–L algorithm produces ordered coefficients, no time need be allotted for ordering coefficients as in the C–T algorithm.

In some applications the high computational speed of the preferred embodiment of the D–L algorithm are not needed. Since the C–T algorithm needs only $n$ memory locations, a savings in memory of $n$ memory locations occurs when the C–T algorithm is used instead of the D–L algorithm. The necessity for only $n$ memory locations results in both a cost and space savings.

The invention consists of two alternatives, one utilizing the D–L algorithm and the other utilizing the C–T algorithm. A unique feature of the invention is that both alternatives, except with minor variations, utilize the same circuitry.

The generic invention consists of the arithmetic logic, an address generator, a timing and memory interface, and a memory.

The arithmetic logic, common to both alternatives, and to both the transform and its inverse, performs the following algorithm:

$$A=\tfrac{1}{2}(C+DW) \quad (1)$$

$$B=\tfrac{1}{2}(C-DW) \quad (2)$$

where C, D, and W are, in general, complex numbers. (The letters A, B, C, D and W are related to $A_r$, $A_{r+n/2}$, $B_r$, $C_r$, and $W^r$ of the above mentioned Cochran et al. paper. As explained therein given $n$ samples $X_k$ a discrete Fourier Transform can be defined as $$A_r=\sum_{K=0}^{n-1}(X_k)W^{rk}r=0,\ldots,n-1$$

where $W=exp(-2\pi j/n)$.

If the series $X_k$ is divided into two series $Y_k=X_{2k}$ $K=0, 1, 2, \ldots, n/2-1$ $Z_k=X_{2k+1}$ the series $A_r$ for $0\leq r\leq(n-1)$ be redefined $A_r=B_r+W^rC_r$ $A_{r+n/2}=B_r-W^rC_r$ This is the relationship expressed in Eq.'s 1 & 2 above. However, both $B_r$ and $C_r$ can be redefined in two series each: $_r$ & $B''_r$; $C'_r$ & $C''_r$. This reduction can be continued until each subfunction is of one sample apiece. The discrete Fourier Transform of a one point function is the sample itself. Thus, the succession of Eq.'s 1 & 2 can be repeated to obtain the discrete Fourier transform of an $n$ sample series.) Among the unique and unobvious features incorporated in the arithmetic logic are the elimination of floating point arithmetic, the incorporation of "premultiplication," and a special look-ahead two's complement arithmetic. The net result is an extremely fast computational speed without electronic complexity.

The address generator specifies the memory locations from which and to which information, processed by the arithmetic logic, is to be transferred. The choice of algorithms performed by the invention is completely defined in the address generator. The address generators specifying the D–L algorithm and the C–T algorithm are similar except for minor wiring variations which can be performed by switches. During the period when arithmetic logic is computing information, the address generators determine the locations into which and from which the information is to be transferred.

The timing control and memory interface are not herein described in detail. Any electronic storage unit (magnetic core memory, capacitor memory, flip-flop banks, etc.) would operate satisfactorily with the invention. Since every memory has its own individual addressing schemes and speed relationships, the timing and memory interface must be specifically constructed to correlate the memory specifications with those of the address generator and arithmetic logic. Such adaption techniques are well within the knowledge of one skilled in the art.

Therefore, it is an object of this invention to implement the recently derived algorithms for Fourier analysis in a real time digital Fourier analyzer.

It is another object of the invention to make a real time digital Fourier analyzer which with modest modifications would be compatible with more than one algorithm.

It is a further object of the invention to perform all real time mathematical calculations in the fastest time possible by eliminating floating point arithmetic and successive complementing.

The foregoing and other objects, features and advantages of the invention will be apparent from the following more particular description of the preferred embodiment of the invention, as illustrated in the accompanying drawings.

In the drawings:

FIG. 1 is an illustration of the preferred embodiment of the generic invention.

FIG. 2$a$ is a graphical representation of the processing of an eight one point series into a one eight point series by the D–L algorithm (from above Cochran et al. paper).

FIG. 2$b$ is a graphical representation of the processing of an eight one point series into a one eight point series by the C–T algorithm (from above Cochran et al. paper).

Figure 1:
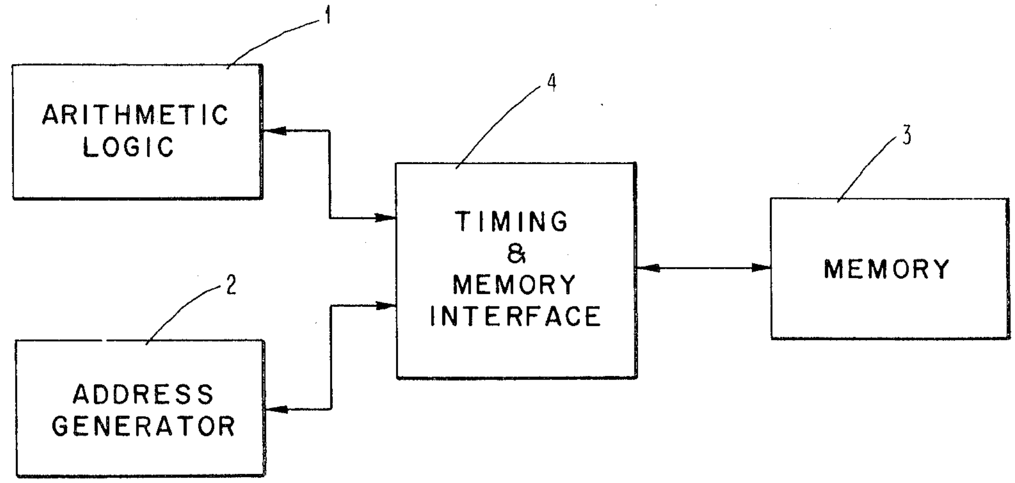

Referring to FIG. 1 of the preferred embodiment of the generic invention is shown. Arithmetic logic 1 accepts the coefficients stored in memory 3 and performs the mathematical operations specified in formulas 1 and 2 above. Since the factors C, D, and W can all be complex, the arithmetic unit 1 actually performs the operations as specified below in formulas 3 through 6 (the subscripts R & I indicate the real and imaginary parts of their respective coefficients).

$A_R=\frac{1}{2}C_R+\frac{1}{2}D_RW_R-\frac{1}{2}D_IW_I$ (3)

$A_I=\frac{1}{2}C_I+\frac{1}{2}D_IW_R+\frac{1}{2}D_RW_I$ (4)

$B_R=-[-\frac{1}{2}C_R+\frac{1}{2}D_RW_R-\frac{1}{2}D_IW_I]$ (5)

$B_I=-[-\frac{1}{2}C_I+\frac{1}{2}D_IW_R+\frac{1}{2}D_RW_I]$ (6)

The arithmetic unit is identical for both alternatives of the preferred embodiment of the invention as will be better understood after reading the detailed description of arithmetic unit 1 below.

It has been found that the largest component of a coefficient stored in memory at a given cycle in the algorithm can not exceed $$\frac{1+\sqrt{2}}{2}$$

times the largest value of any preceding cycle. Because of this fact, arithmetic unit 1 does not have any floating point arithmetic and still can maintain numerical significance in all the bit positions. All that is performed is a test for a one in either the most significant or next most significant bit of any coefficient produced during a cycle. If the test proves negative, a counting register is incremented by one and all data during the following cycle is shifted one bit to the left (multiplied by two) when it is transferred from the memory to the arithmetic unit. At the end of all the calculations the correct magnitude can be figured by examining the counting register.

Another unique feature of arithmetic logic 1 is the incorporation of a look-ahead two's complement arithmetic. Again, this will be better understood after reading the description below. A final feature incorporated into the arithmetic logic 1 is the premultiplication, which although it is not a completely new feature with this invention, (see Van Blerkom et al. U.S. Pat. application Ser. No. 654,568, Filed July 19, 1967), it has been uniquely adapted for this specialized application.

Address generator 2 specifies the memory locations from which the information is to be withdrawn and transferred to the arithmetic logic 1 and where the information is to be placed after processing by the arithmetic logic 1. The memory locations which address register 2 must specify can easily be seen from FIGS. 2*a* and 2*b*.

Figure 2A:
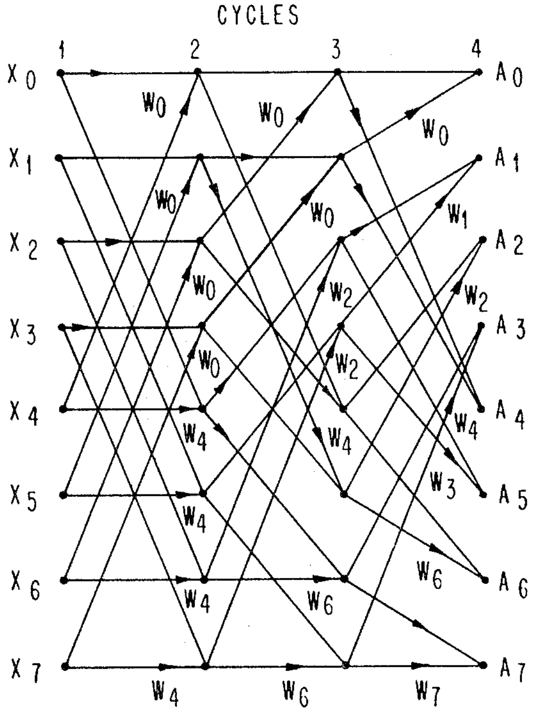

Referring to FIG. 2*a*, a graphical representation of the calculations of Fourier coefficients by the D–L algorithms for eight one point series is illustrated. (Remember, a signal is its own one point Fourier series.) The information necessary for the first cycle of mathematical operations, $X_0$ through $X_7$ is considered for illustration purposes to be in memory locations 0 through 7. Further, for purposes of this illustration the superscript on the letter will denote the mathematical cycle (column) and the subscript will denote the step (row) in the cycle. For example, $X_0^1$ indicates that it is the first mathematical cycle and the 0 step of that cycle.

The constants W will be considered to be located in memory locations 0 through 7. Further, as shown in the above mentioned Cochran et al. paper $W_k=-W_{k+n/2}$, i.e. $W_0=-W_4$.

The address generator in the preferred embodiment defines one address for $W_k$ and the arithmetic unit manipulates the sign necessary to agree with equations 1 & 2. Thus, only four memory positions are needed for the $W_k$ in the calculations of an eight point series. Although in this example we have used memory locations 0 through 7 twice (once for the A's & B's and once for the $W_k$), persons skilled in the art will readily understand how addresses can be modified by merely adding a constant so that the saMe address in actual practice will not be used twice, or an additional memory unit can be added.

During the first cycle, $X_0^1$ is added to $X_4^1$ multiplied by $W_4$, i.e. $X_0^1+X_4^1W_0$ (the sum is labeled $X_0^2$). During cycle 2, $X_0^2$ is added both to ($X_2^2W_0$ sum labeled $X_0^3$ and $X_2^2W_4$ (sum labeled $X_4^3$). If $X_4^3$ was written into the memory location indicated by the graph, it would remove $X_4^2$ from storage. This latter point is needed in a later calculation, i.e. $X_4^2+X_6^2W_2$ and $X_4^2+X_6^2W_6$. Therefore, $X_4^3$ must be stored in another location. This is the reason that the D–L algorithm demands two sets of memory locations. (Although an elaborate system could be arranged to avoid having two sets of memory locations by temporary delay lines or other means well known in the art, the cost for this extra equipment balanced against the savings due to the deletion of an extra set of memory locations does not warrant such a system in the preferred embodiment.)

Figure 2B:
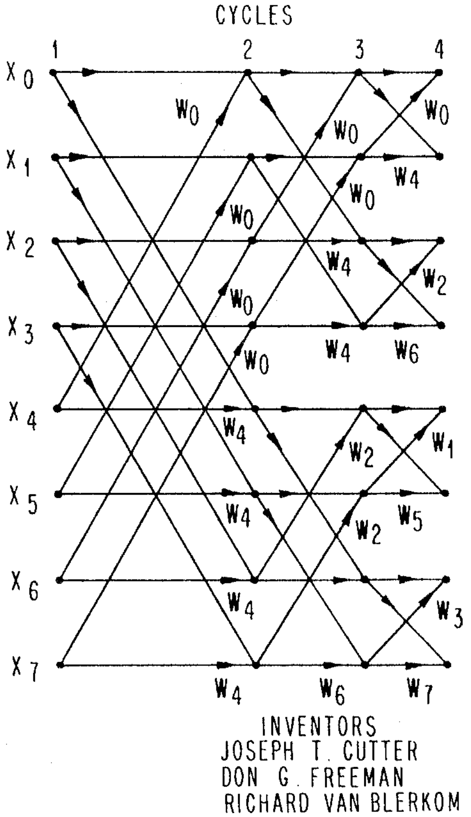

Similarly, FIG. 2*b* illustrates the mathematical manipulation in the C–T algorithm. The first cycle of the C–T algorithm is identical in manipulation to the first cycle of the D–L algorithm. In the second cycle $X_0^2$ is added to $X_2^2$ multiplied by $W_0$ (sum labeled $X_0^3$) and $X_2^2$ multiplied by $W_4$ (sum labeled $X_2^3$). Since neither $X_2^2$ nor $X_0^2$ is utilized after this calculation, $X_0^3$ and $X_2^3$ can be written into locations occupied by $X_0^2$ and $X_2^2$ without destroying any information needed at a later time. Thus only one memory is needed for the C–T algorithm.

Memory 3 can be any memory known in the art. A number of such memories are listed above. As noted there each memory has its own individual operating characteristics and speeds. Therefore, timing and memory interface 4 must be custom designed to match the speeds of arithmetic logic 1, address register 2, and memory 3. Since such designing is merely within the skill of the art, and the specific features of such designs form no part of the invention, a specific embodiment is not included here.

Referring to FIG. 1, and summarizing, arithmetic logic 1 and address generator 2 are connected to timing and memory interface 4, respectively. Similarly, memory 3 is electrically connected to timing and memory interface 4. Timing and memory interface 4 provides a buffer and timing unit in order that information can be transferred in and out of memory 3 and into and out of arithmetic logic 1.

ARITHMETIC UNIT

Figures 3, 3A:
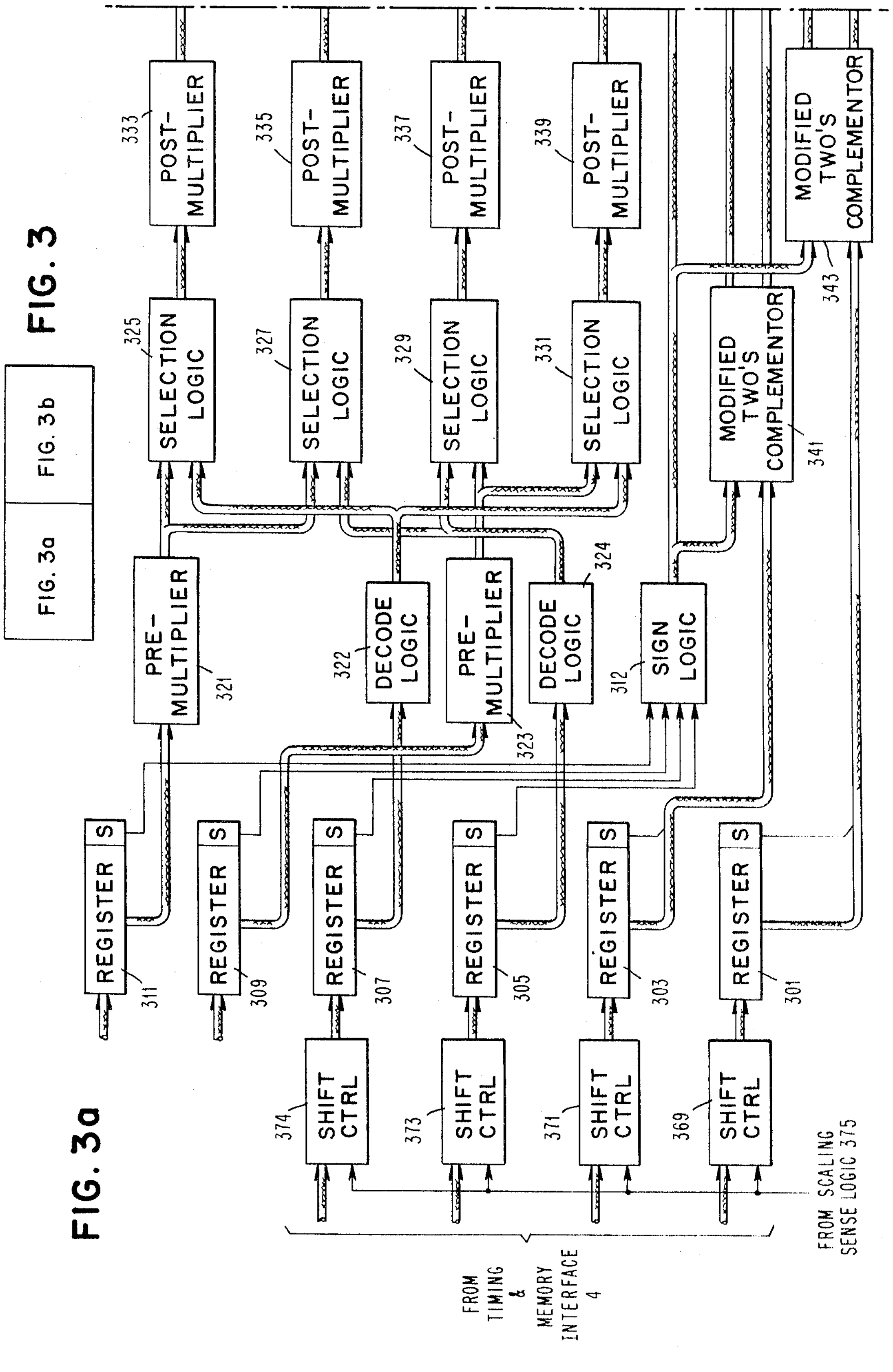
FIG. 3 is a diagram in two parts of the preferred embodiment of the arithmetic logic.
Figure 3B:
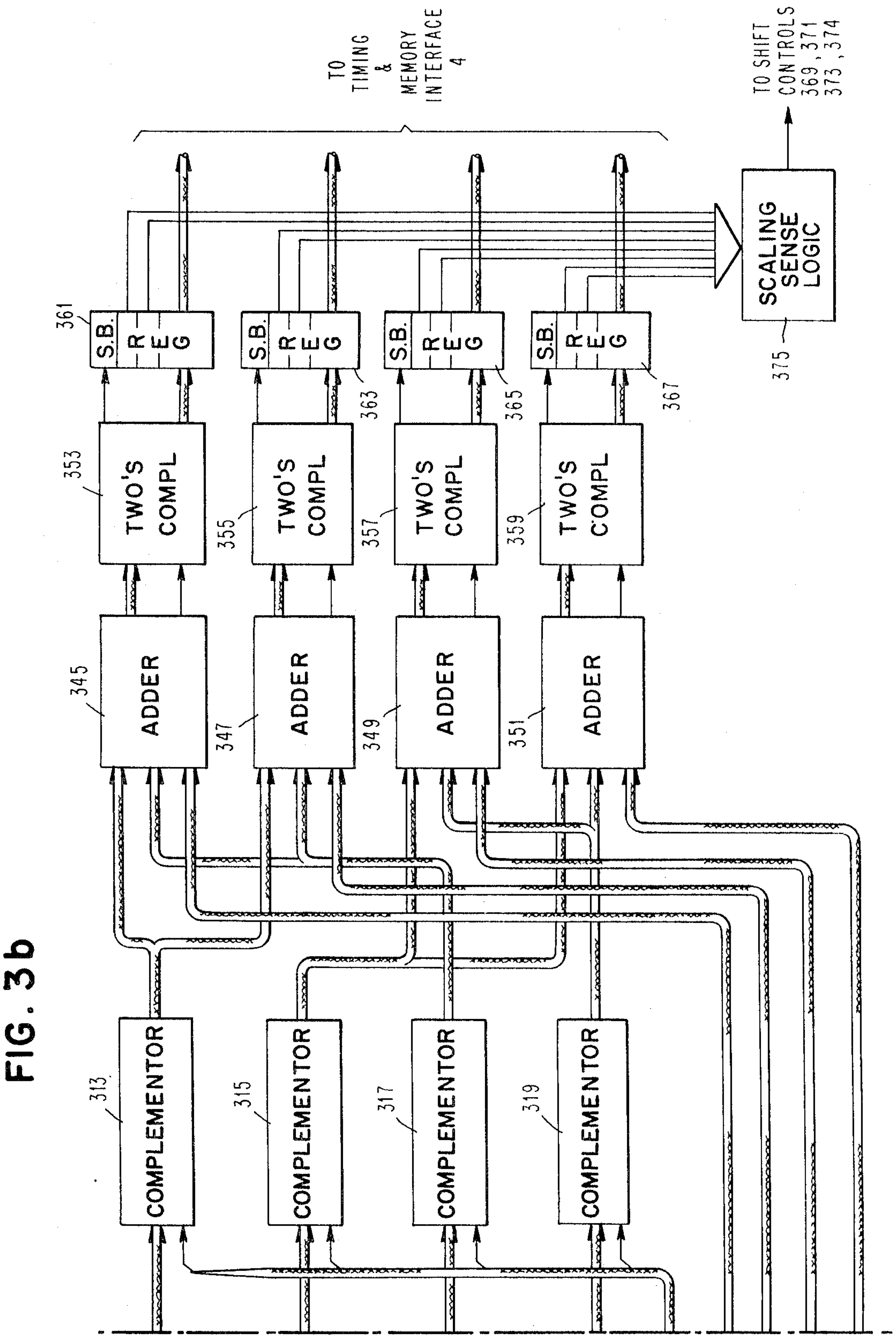
Figures 6, 7:
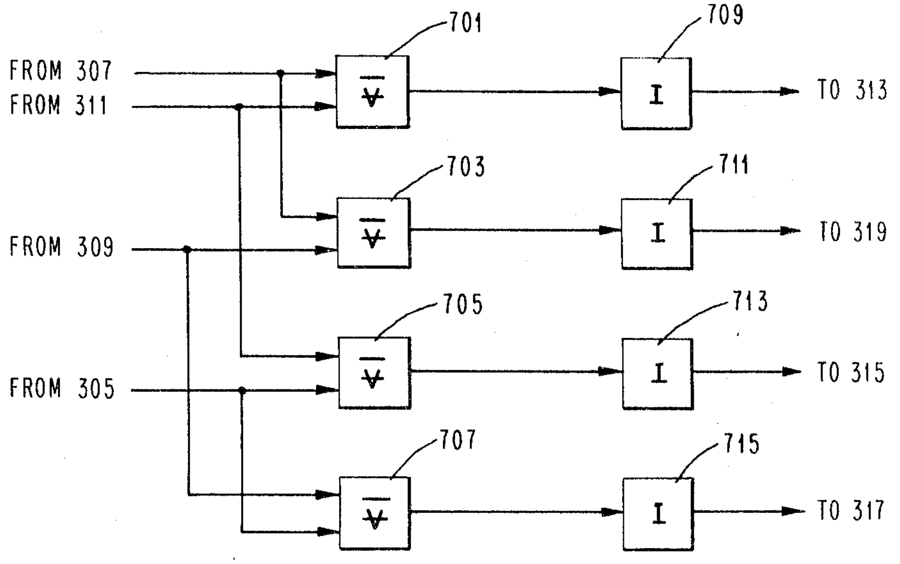
FIG. 6 is a chart of the various states that the registers illustrated in FIGS. 4 and 5 assume during various stages of the calculation of a complete eight point series.
FIG. 7 is the preferred embodiment of sign logic 312 in FIG. 3.

Referring to FIG. 3, the preferred embodiment of the arithmetic unit is illustrated. A pair of C's and D's are withdrawn from memory, divided into their real and imaginary parts (hereinafter to be subscripted with an R for real and an I for imaginary), processed by shift controls 371, 369, 373, and 374, and stored in registers 303($C_R$), 301($C_I$), 305($D_R$), and 307($D_I$), respectively. The detailed operation of the shift controls 369, 371, 373, and 374 are discussed below. The real and imaginary part of the constant $W_k$ are stored in registers 309 and 311 respectively. The contents of the sign bit of registers 305, 307, 309, and 311 are fed to sign logic 312. Sign logic 312 determines the sign of the various products to be performed, i.e., $D_RW_R$, $D_IW_R$, $D_IW_I$, $D_RW_I$. The signs of these various products are fed to complementors 313, 315, 317 and 319. Reference is to be made to FIG. 7 for a more specific embodiment of the sign logic.

Simultaneously, the significant numerical bits of registers 309 and 311 are fed to premultipliers 323 and 321, respectively. Premultipliers 323 and 321 form partial products $W_R$, $2W_R$, . . . , $7W_R$ and $W_I$, $2W_I$, . . . , $7W_I$. The partial products produced by premultiplier 321 are fed into selection logic 325 and 327; the partial products of premultiplier 323 are fed into selection logic 329 and 331. The significant numerical bits of register 307 is fed into decode logic 322; the significant numerical bits of register 305 are fed into decode logic 324. The decode logic 322 and 324 take the significant numerical bits from their respective registers 307 and 305 and divide them into 3-bit numbers. The 3 bit-binary numbers are decoded into the eight possible values, (0, 1, . . . 7). The decoded 3-bit number then is fed from decode logic 322 to selection logics 325 and 331; and from decode logic 324 into selection logics 327 and 329. The selection logic (which in the preferred embodiment is an ordinary switching network) selects the partial products of W formed by premultipliers 321 and 323 according to the decoded 3-bit sections of D. Postmultipliers 333, 335, 337, and 339 take the selected partial products of $W_R$ from selection logic 325, 327, 329, 331, respectively, multiply them by the appropriate power of 2, and combine the resultant products.

For example, assume that the contents of registers 307, $D_I$, is 110111001110. Decode logic 322 decodes this 12-bit number as four separate 3-bit numbers (i.e., 110; 111; 001; 110). Each of these 3-bit numbers in selection logic 331 is used to select a corresponding output of premultiplier 323 (i.e., $6W_R$; $7W_R$; $W_R$ and $6W_R$). Postmultiplier 339 uses these four partial products to compute the complete product as follows:

$$D_I W_R = 6W_R \times 2^9 + 7W_R \times 2^6 + W_R \times 2^3 + 6W_R \times 2^0 \quad (7)$$

The above combination of premultiplier, decode logic, selection logic, and postmultiplier is given by way of preferred embodiment. However, one skilled in the art could easily vary the combination of the various functions so as to eliminate the postmultiplier. Reference is made to Van Blerkom et al., U.S. Pat. application Ser. No. 654,568, filed July 19, 1967. The illustrated preferred embodiment results in a minimum of complexity with a maximum of speed.

Since the products produced by postmultipliers 333, 335, 337 and 339 may either be positive or negative, they are fed into complementors 313, 315, 317, and 319 to correct their sign insufficiencies. According to the direction of sign logic 312 (see below) complementors 313, 315, 317, and 319 perform a one's complement, if necessary, upon the various products. The output of the complementors are then suitable for addition to other products to form the final coefficients.

The output of sign logic 312 is also fed into modified two's complementors 341 and 343. Since complementors 313, 315, 317 and 319 perform a one's complement, which when added to a greater positive number results in a sum one less than the actual true total, a correction must be made. This correction is performed in modified two's complementors 341 and 343. Modified two's complementors 341 and 343 sum the number of one's complements performed by complementors 313, 315, 317, and 319. The number of complements performed by these complementors is not only dependent upon the original signs of the various factors multiplied to obtain the final products but also the signs of the various addends of formulas 2 through 6. For example, consider the computation of $A_R$ where $C_R$ and $D_R$ are negative numbers, $D_I$, $W_I$, and $W_R$ are positive numbers. Using a bar above the factor to signify a one's complement, equation 3 can be developed as follows:

$$A_R = \tfrac{1}{2}(-C_R) + \tfrac{1}{2}(-D_R)(W_R) - \tfrac{1}{2}(D_I)W_I$$
$$= \tfrac{1}{2}(\overline{C}_R + 1) + \tfrac{1}{2}(\overline{D_R W_R} + 1) + \tfrac{1}{2}(\overline{D_I W_I} + 1)$$
$$= \tfrac{1}{2}[(\overline{C}_R + 3) + (\overline{D_R W_R}) + (\overline{D_I W_I})] \quad (8)$$

Thus, it is seen from Eq. 8 that a 3 must be added into the final sum of one's complements to arrive at a sum twice the true sum.

These correction factors are added into the one's complement of the significant numerical bits of registers 303 and 301 by modified two's complementors 341 and 343, respectively. Each of the modified two's complementors have two outputs, one output for each of their respective adders 345, 347, 349, and 351. The upper outputs of each of the modified two's complementor 341, 343 represent $+C_R$ and $+C_I$, respectively; the lower outputs represent $-C_R$ and $-C_I$ respectively. Thus, one output of modified two's complementor 341 forms one input of adder 345 along with outputs from complementors 313 and 317; the other output of modified two's complementor 341, along with outputs from complementors 313 and 317, form the input of adder 347. Similarly, one output of modified two's complementor 343, along with outputs from complementor 315 and 319, form the input of adder 349; and the other output of modified two's complementor 343 along with outputs from complementors 315 and 319, form the input of adder 351.

The outputs of adders 345, 347, 349, and 351 represent $2A_R$, $2B_R$, $2A_I$, and $2B_I$, respectively. These outputs are fed into two's complementors 353, 355, 357, and 359, respectively.

Since the sums produced by 345, 347, 349, and 351 are twice the true coefficient, a division of two is necessary. Because the preferred embodiment uses the binary number system, this division is performed by a redefinition of the lines between adders 345, 347, 349, and 351 and complementors 353, 355, 357, and 359, respectively, i.e. shifting the lines one place to the right, thereby causing a division of two.

These latter complementors perform a two's complement upon the output of their respective adders if one is needed, that is, if a negative sum is produced. Since in taking a two's complement an adder is generally required (i.e. every bit is inverted and a one is added), complementors 353, 355, 357, and 359 can roundoff the sum without any additional loss of time for the possible carry propagation. The outputs of complementors 353, 355, 357, and 359, both numerical and sign bits, are fed into registers 361, 363, 365, and 367.

The complete contents of registers 361, 363, 365, and 367 are fed into timing and memory interface 4. Also, the contents of the two highest order numerical bits of these latter shift registers are fed into scaling sense logic 375.

D–L ADDRESS GENERATOR

Figure 4:
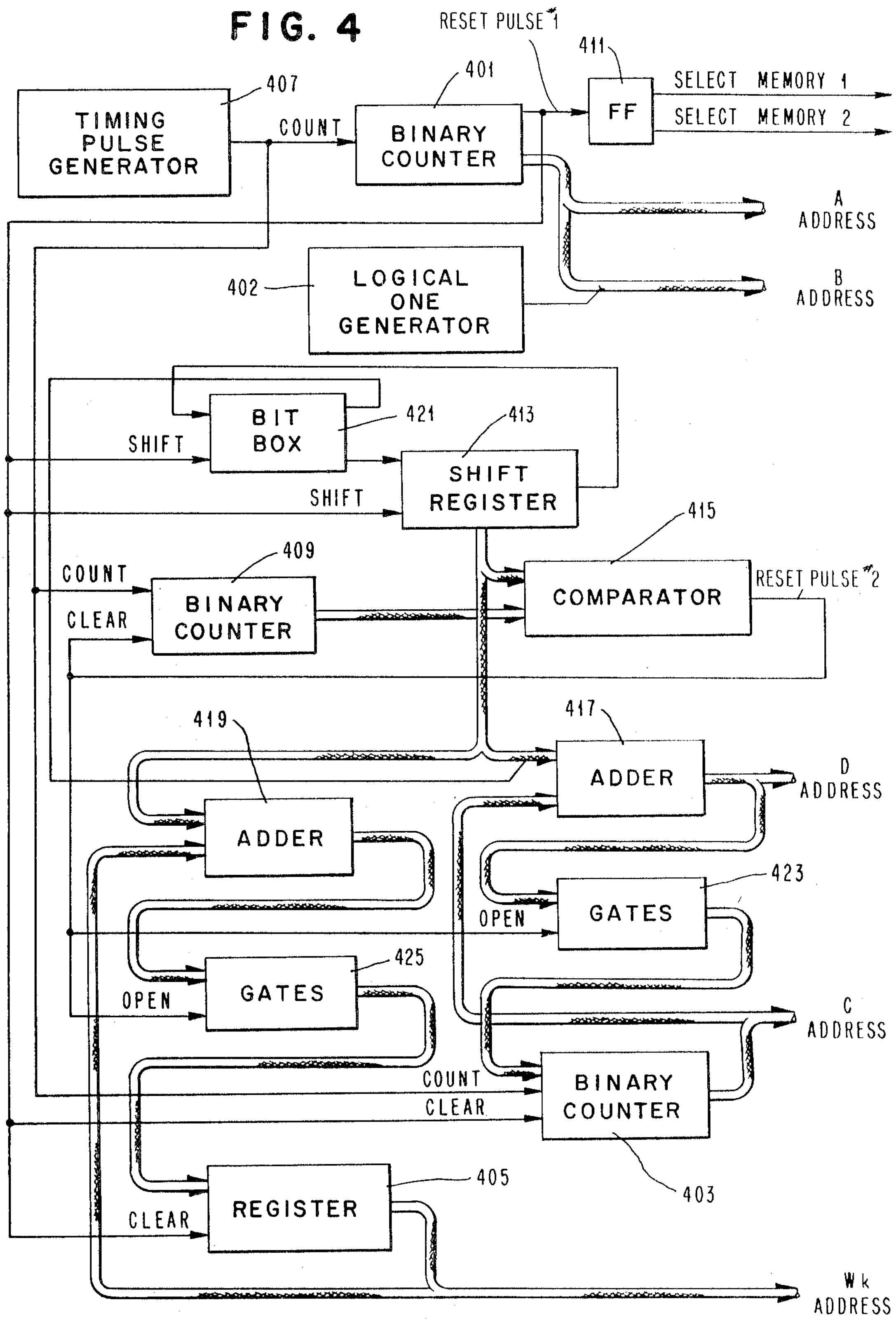
FIG. 4 is a preferred embodiment of the D–L alternative of the address generator.

FIG. 4 illustrates the D–L alternative of the preferred embodiment of the address generator 2. The address register provides an indexing mechanism to indicate which memory locations information is to be removed from and stored in. The address register of the preferred embodiment is especially simple in that it utilizes certain recurring relations between memory locations from where and to where the information is fetched and stored. Essentially, the address register must keep tract of which cycle is being processed. Each cycle reduces the series in half from the cycle before, that is, during the first cycle there are eight one point sample sequences, during the second cycle there are four two point sample sequences, etc. The result is that during the first cycle $X_0^1$ is combined with $X_4^1$; but during the second cycle $X_0^2$ is combined with $X_2^2$; and during the third cycle $X_0^3$ is combined with $X_1^3$. Thus, the difference between the subscripts of the addend factors is reduced by one-half each subsequent cycle.

As is further described below the step in the cycle at which the computation is then at is indexed by binary counter 401; the cycle at which the computation is then at is indexed by the combination of bit box 421 and shift register 413. The later combination accomplishes its function by each cycle shifting the bit contained therein one position to the right, and thus halfing its contents when read as a binary number (i.e. 100 is twice as large as 010). The information generated by binary counter 401 and shift register 413 is used to control other counters which specify the various memory addresses.

Address generator 2 illustrated in FIG. 4, consists of binary counter 401 of $\log_2 n/2$ bits where $n$ is the length of the series to be computed. The number present in binary counter 401 represents the address into which the A information is to be written. The address into which the B information is to be written is produced by adding a logical one from logical one generator 402 to the bit position higher in order than the largest capable address produced by binary counter 401. Logical one generator 402 can be a voltage source generating a voltage of the level indicating a logical one. Binary counter 401 counts up one bit for every timing pulse received from timing pulse generator 407. Timing pulse generator 407 also causes binary counter 409 and binary counter 403 to count one.

The overflow of binary counter 401 produces a reset pulse (hereinafter referred to as reset pulse 1) which resets binary counter 403 and register 405. Also, it causes flip-flop 411 to select the memory then not in use. Lastly, the overflow from binary counter 401 causes shift register 413 and bit box 421 to shift one bit. Shift register 413 shifts from left to right. The contents of shift register 413 (whose length is $\log_2 n/2$ bits) is read as a binary number by comparator 415, adder 417 and adder 419. Bit box 421 receives the bit shifted out of the right-hand side of shift register 413, and in turn upon the next reset pulse 1 shifts that bit into the left-hand side of shift register 413. The bit contained in bit box 421 is not registered as a high order bit in the binary number considered to be contained in shift register 413 by comparator 415 or adder 419; i.e., when bit box 421 contains the binary bit, the binary number considered to be in shift register 413 is zero. Throughout, adder 417 does read the bit contained in bit box 421, i.e., when bit box 421 contains the binary bit, adder 417 sees a one in the high order bit of the combination of $(1+\log_2 n/2)$ bits.

As mentioned above binary counter 409 (whose length is $\log_2 n/2$ bits) counts one for every timing pulse generated ky timing pulse generator 407. The number contained within binary counter 409 is compared with that contained in shift register 413 by comparator 415. When the numbers contained in shift register 413 and 409 are identical, comparator 415 produces a reset pulse (hereinafter referred to as reset pulse 2). Reset pulse 2 resets binary counter 409, gates 423 and 425.

Binary counter 403 (whose length is $n/2$ bits) produces the memory address from which the C information is to be read. The number contained in binary counter 403 is fed into adder 417 along with the number contained in shift register 413. The sum of these two numbers produces the address from which the D information is read. When a reset pulse 2 is produced by comparator 415, gate 423 is opened, causing the sum produced by adder 417 to be stored in binary counter 403.

Register 405 of length $\log_2 n/2$ produces the address from which the $W_k$ constant is to be withdrawn (remember $W_k = -W_{k1n/2}$). The contents of register 405 along with those of shift register 413 are summed by adder 419. When a reset pulse 2 occurs, the sum produced by adder 419 replaces the then stored contents of register 405.

EXAMPLE—D–L ADDRESS GENERATOR

The operation of the preferred embodiment of the address unit will now be illustrated by an example. Reference is to be made to FIG. 4, the preferred embodiment of the address unit for the Danielson-Lanczos embodiment, and FIG. 6, a chart of the contents of the various registers and counters in a complete computation of one eight point series. Assume $n=8$, then binary counter 401 contains two bits, binary counter 403 contains four bits; shift register 413 contains two bits; and binary counter 409 contains two bits. It is assumed that the above counters and shift registers are in a state specified by the first row in FIG. 6. That is, counter 401 contains a zero, counter 403 contains a zero, shift register 413 contains the energized bit in bit box 421 denoting a four to adder 417 and a zero to comparator 415 and adder 419, binary counter 409 contains a zero and shift register 405 contains a zero.

The address from which the C information is to be read is specified by binary counter 403, i.e. zero. Since adder 417 reads the contents of shift register 413 and bit box 421 as a four, the D information address is four, i.e. the contents of bit box 421 and shift register 413 added to that of binary counter 403. The address into which the A information is to be read is zero, and that into which the B information is to be read is four. Assume that flip-flop 411 is set so as that the C's and D's are read from memory one and the A's and B's are written into memory two. The $W_k$ address is specified by register 405, i.e. zero. Referring to FIG. 2a it is seen that the calculation denoted by the products $X_0^2$ and $X_4^2$ are specified by the address register in FIG. 4.

Timing pulse generator 407 produces a pulse which results in a one in binary counters 401, 403, and 409. Thus the C and D addresses specified are 1 and 5, respectively; and the A and B addresses specified are 1 and 5, respectively. Since neither binary counter 401 overflows nor comparator 415 registers an equality, neither produces a reset pulse. Similarly, the numbers stored in binary counters 401, 403, and 409 increase through calculation 4.

The addresses specified before address calculation 4 are the following: C address–3, D address–7, A address–3, B address–7. The correct $W_k$ is still in the zero address location and is specified by register 405. Thus the products denoted by $X_3^2$ and $X_7^2$ are defined by the address register.

The timing pulse next generated by timing pulse generator 407 causes binary counter 401 to count, binary counter 401 to overflow (it now contains a zero in its significant bit position). The overflow of binary counter 401 causes a reset pulse 1 to occur. Reset pulse 1 causes register 405 to be reset to zero (i.e. register 405 remains the same) shift register 413 shifts one bit to the right (thereby being read as a two), and binary counter 403 is reset to zero. Also, reset pulse 1 sets flip-flop 411 to select memory one for storing all newly calculated A's and B's and to select memory two for reading the C's and D's. As explained above this is to prevent the new A's and B's from destroying the A's (C's) and B's (D's) of the previous cycle.

Thus, before address calculation 5 the contents of the various counters and registers have been reset so that the addresses specified therein are the addresses required for the calculation of the Danielson-Lanczos algorithm during the number two cycle. The next reset pulse is produced after address calculation 6. The timing pulse causes binary counter 401 to count one resulting in binary counter 409 and shift register 413 both containing a two. Comparator 415 registers an equality and produces a reset pulse 2. Reset pulse 2 clears binary counter 409 to a zero, allows the sum produced by adder 417 to be stored in binary counter 403 by opening gate 423, a four is placed in binary counter 403 which is the sum of the previous contents of binary counter 403 (a two) after the last timing pulse and the contents of shift register 413 (a two), and allows register 405 to store the sum produced by adder 419 (a two).

Similarly, address generator 2 steps through the complete set of addresses needed for the D–L algorithm. For the correct operation of the preferred embodiment the only additional requirement than those explained above is that reset pulse 1 has priority over reset pulse 2. That is when reset pulse 1 and reset pulse 2 are produced simultaneously, binary counter 403 should be cleared to zero, and not contain the sum produced by adder 417.

C–T ADDRESS GENERATOR

The C–T and D–L alternatives of the preferred embodiment of the address generator vary in only minor respects. As has already been discussed the Cooley-Tukey algorithm places the calculated information into the same memory location from where the operated upon data with withdrawn (see FIG. 2b). Therefore, it is only necessary to utilize the C and D address information produced by binary counter 403 and adder 417, respectively, for both read and write memory locations. The input into adder 419 from shift register 413 must be disconnected and replaced with an input representing a logical one. Lastly, the output of register 405 must be read backwards (crossover box 526), i.e. the most significant bit must be read as the least significant bit and vice versa. This reverse read binary number represents the $W_k$ address.

Figure 5:
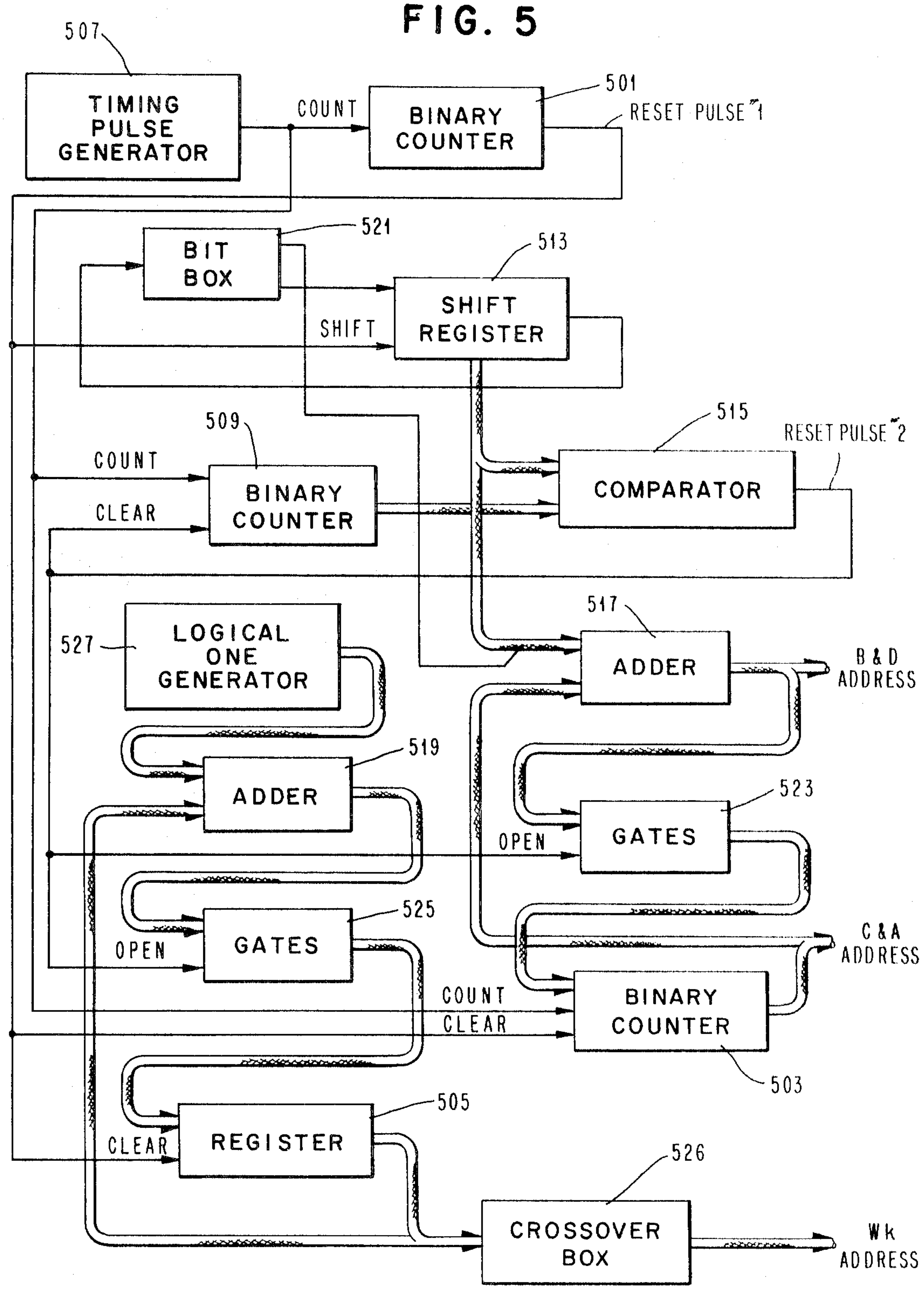
FIG. 5 is a diagram of the preferred embodiment of the C–T alternative of the address generator.

With the above modification FIG. 4 assumes the configuration of FIG. 5 which will correctly generate the memory locations needed for obtaining the necessary information for the C-T algorithm.

Reference is also made to FIG. 6 and specifically the column labeled C-T for the calculation of the $W_k$.

Since the calculation of the read and write memory location is identical to the write location of the D-L alternative above, it will not be repeated. As an example of the calculation of the $W_k$ constant, reference is made to FIG. 6, calculation 9. At this point binary counter 501 contains a zero, binary counter 503 contains a zero, and register 505 contains a zero. Immediately after the timing pulse has occurred, counters 501, 503, and 509 will increase their contents to a logical one. Because the contents of shift register 513 and binary counter 509 are identical, a reset pulse 2 will occur. This will cause the sum of the contents of register 505 (a zero) and the logical one to be stored in register 505. Simultaneously, the contents of binary counter 503 is modified to a logical 2 and that of binary counter 509 to a zero. Thus, the locations specified by the address generator of FIG. 5 are those in FIG. 6, calculation 10.

SIGN LOGIC

Referring to FIG. 7, a diagram of sign logic 312 is illustrated. The sign bits of register 305 are connected to not-Exclusive OR 705, 707; the sign bit of register 307 is connected to not-Exclusive OR 701 and 703; the sign bit of register 309 is connected to not-Exclusive OR 703 and 707; and the sign bit of register 311 is connected to not-Exclusive OR 701 and 705. The output of not-Exclusive OR's 701, 703, 705, and 707 are connected to inverters 709, 711, 713 and 715, respectively. The outputs of inverters 709, 711, 713, and 715 are connected to complementors 313, 319, 315, and 317, respectively.

The operation of sign logic 312, which indicates the sign of the resultant product from the input signs, can readily be understood by one skilled in the art from the logic diagram of FIG. 7. For this reason, no detailed operation of the diagram is presented herein.

TWO'S COMPLEMENTOR

Figures 8, 9:
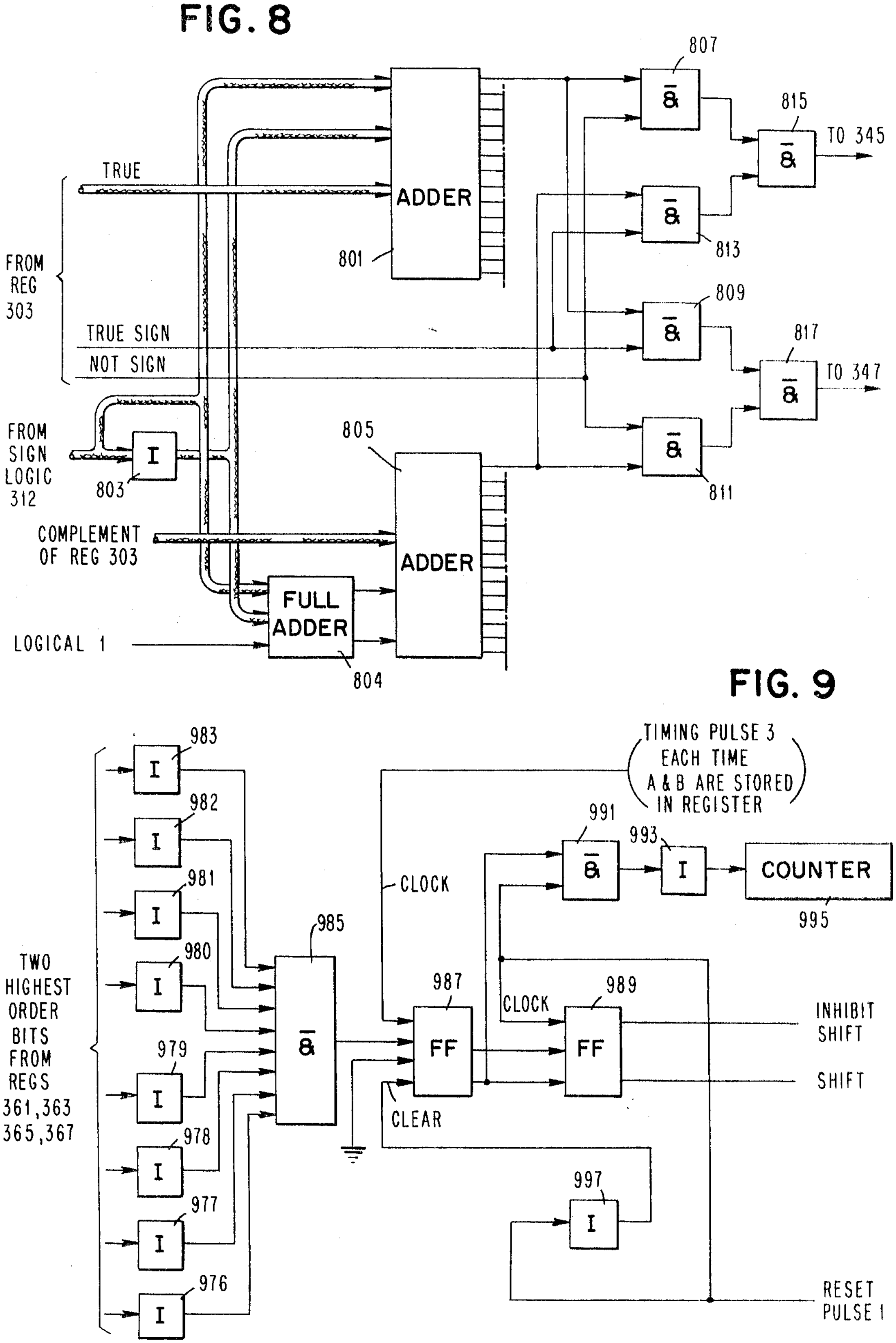
FIG. 8 is the preferred embodiment of modified two's complementor 341 or 343 in FIG. 3.
FIG. 9 is the preferred embodiment of sense logic 375 in FIG. 3.

FIG. 8 illustrated the preferred embodiment of modified two's complementor 341 or 343. For purposes of illustration, modified two's complementor 341 will be considered as the illustrated modified two's complementor in FIG. 8.

Referring to FIG. 8, the eleven most significant bits from register 303 are fed into adder 801. Added to this number are both the true signal sent by sign logic 312 to complementor 317 (the sign of the product $D_RW_R$) and the inverted signal (the inversion is performed by inverter 803) sent by sign logic 312 to complementor 313 (the sign of the product $D_IW_I$).

Adder 805 adds the complement of the contents of register 303 (the preferred embodiments contain registers which produce the true and the complement of its contents), and the sum of the signals sent from sign logic 312 to complementor 313, the inverted signal sent by sign logic 312 to complementor 317, and a logical one. This last sum is formed by full adder 804.

The high order output of adder 801 is connected to the input of NAND logic 807 and 809. The high order output of adder 805 is connected to NAND logic 811 and 813. The sign bit of register 303 is connected to NAND circuits 813 and 809; and the inverted signal of sign register 303 is connected to NAND gate 807 and 811.

The outputs of NAND gates 807 and 813 is connected to NAND logic 815; the outputs of NAND logic 809 and 811 are connected to NAND logic 817.

Finally, the output of NAND logic 815 forms the high order input of adder 345; and the output of NAND logic 817 forms the high order input of adder 347. Similarly, each of the other outputs of adders 801 and 805 have similar output circuitry. The total output circuitry causes the sum produced by adder 801 to be channeled to adder 345 and the sum produced by adder 805 to be channeled to adder 347, or vice versa.

Thus, depending on the contents of the sign bit of register 303 (i.e., the sign of $C_R$) the significant bits of register 303 with the correction figures for the one's complement (i.e., for the signs of the products $D_RW_R$ and $D_IW_I$) will be channeled to the correct adder in accordance with equations 3—6.

EXAMPLE—MODIFIED TWO'S COMPLEMENTOR

The detailed operation of modified two's complementor 341 illustrated in FIG. 8 can be easily understood by one skilled in the art from studying FIG. 8. However, for purposes of illustration an example will be explained. Assume that the contents of the sign bit of registers 305, 307, 309, and 311 are a 0, 1, 1, and a 0, respectively; where a 1 stands for a plus sign and a 0 stands for a minus sign. Referring to FIG. 7, not-Exclusive OR 701 has a 0 at its output and inverter 709 has a 1 at its output; not-Exclusive OR 707 has a 0 at its output; and inverter 715 has a 1 at its output.

Also, assuming that the sign bit of register 303 contains a 1 (meaning a positive number in the significant bits), and referring to FIG. 8, the output of adder 801 will represent the significant numerals in register 303 plus a 1 (the output of inverter 709 (a 1) plus the inverted output of inverter 715 (a zero). The sign bit of register 303 will cause adder NAND logic 813 and 809 to be conditioned. Therefore, the output of adder 801 will appear eventually as the output of NAND logic 817. Similarly, the output of adder 805 will appear eventually as the output of NAND logic 817.

The output of adder 804 is a logical 2 (the sum of the logical 1, the output of inverted 709, and a logical zero, the inverted output of inverter 715). As explained above the logical 1 input to full adder 804 is the extra one needed to calculate the correct two's complement. The output of full adder 804 is added to the one's complement of the number contained in register 303 by adder 805. This output eventually appears as the output of NAND 815 after being channeled through NAND 813 as explained in the paragraph above.

SCALING SENSE LOGIC

Referring to FIG. 9, a detailed embodiment of scaling sense logic 375 is shown. The outputs from the two high order bits of each of the registers 361, 363, 365, and 367 are connected to inverters 976—983, respectively. The outputs of these inverters in turn form the input of NAND logic 985. The output of NAND logic 985 forms one input of flip-flop 987. Flip-flop 987 is of the type which has two inputs, two outputs, and two control lines. In FIG. 9 these latter two lines are labeled clear and clock. The clear line causes flip-flop 987 to reset so that the voltage on the lower output would be a logical one. The clock line allows flip-flop 987 to assume the state of the input which has contained thereon a logical one. If no input has a logical one, then the flip-flop remains in its previous condition. A flip-flop which operates in the manner of flip-flop 987 is Texas Instruments SN 7473N.

The upper and lower outputs of flip-flop 987 form the upper and lower inputs, respectively, of flip-flop 989. Also, the lower output of flip-flop 987 forms one input of NAND logic 991. The other input of NAND logic 991 is formed by reset pulse 1, i.e. the overflow from binary counter 401 illustrated in FIG. 4. The output of NAND logic 991 forms the input of inverter 993; whose output in turn forms the input of counter 995.

Reset pulse 1, the overflow of binary counter 401, forms the input of inverter 997; whose output in turn forms the clear line for flip-flop 987. Also, reset pulse 1 forms the clock line for flip-flop 989 and an input to NAND 991.

The upper and lower outputs of flip-flops 989 form the inhibit shift and shift, respectively, for shift control 369, 371, 373, and 374.

Normally, whenever there is a zero in the high order two bits of registers 361, 363, 365, and 367, the output of inverters 976—983 are all up. This causes the output of NAND logic 985 to be down. When timing pulse 3 (whenever an A and B are transferred into registers 361, 363, 365, and 367) occurs, which clocks flip-flop 987, no change will occur. If no one's appear in the high order two bits of registers 361, 363, 365, and 367 during the complete cycle, at the end of the cycle the lower output of flip-flop 987 will still be in the up state. At this time reset pulse 1 occurs, simultaneously causing the contents of flip-flop 987 to be stored in flip-flop 989 and returning flip-flop 987 to its down state. Also flip-flop 987 has remained in the down state of a complete cycle, its upper output has not been conditioned. Also reset pulse 1 will cause the output of NAND 991 to go down the output of inverter 993 to go up, and counter 995 to advance one.

Since it has been hypothesized for the above paragraph that 987 was in a down condition, flip-flop 989 will now also be in the down state. Flip-flop 989 will remain in the down state for the complete next cycle, i.e. its lower output will be conditioned. Thus, as will be better seen in the following description of FIG. 10, shift controls 369, 371, 373, and 374 will shift the information to be fed into registers 301, 303, 305, and 307, respectively, one bit to the left.

However, if any of the registers 361, 363, 365, and 367 during the cycle contain a one in the two high order bits the output of NAND logic 985 will rise. Thus, when a timing pulse 3 occurs, flip-flop 987 will store a logical one. At the end of the cycle when reset pulse 1 occurs, flip-flop 989 will store a one causing an inhibit shift pulse to be sent to shift control logic 369, 371, 373, and 374. Also, reset pulse 1 will reset flip-flop 987, so that a logical zero is stored therein. Simultaneous with the reset pulse 1, the output of NAND logic 991 will remain up and the output of inverter 973 will remain down. Thus, counter 995 will not be advanced.

Counter 995 will contain at the end of a complete calculation of the Fourier coefficients the exact number of shifts that have occurred. One skilled in the art, armed with this information, can easily compute the numerical significance of the final coefficients. Thus it is seen, with the exception of the operations performed by the device in FIG. 9, the invention utilizes fixed point arithmetic.

SHIFT CONTROLS

Figure 10:
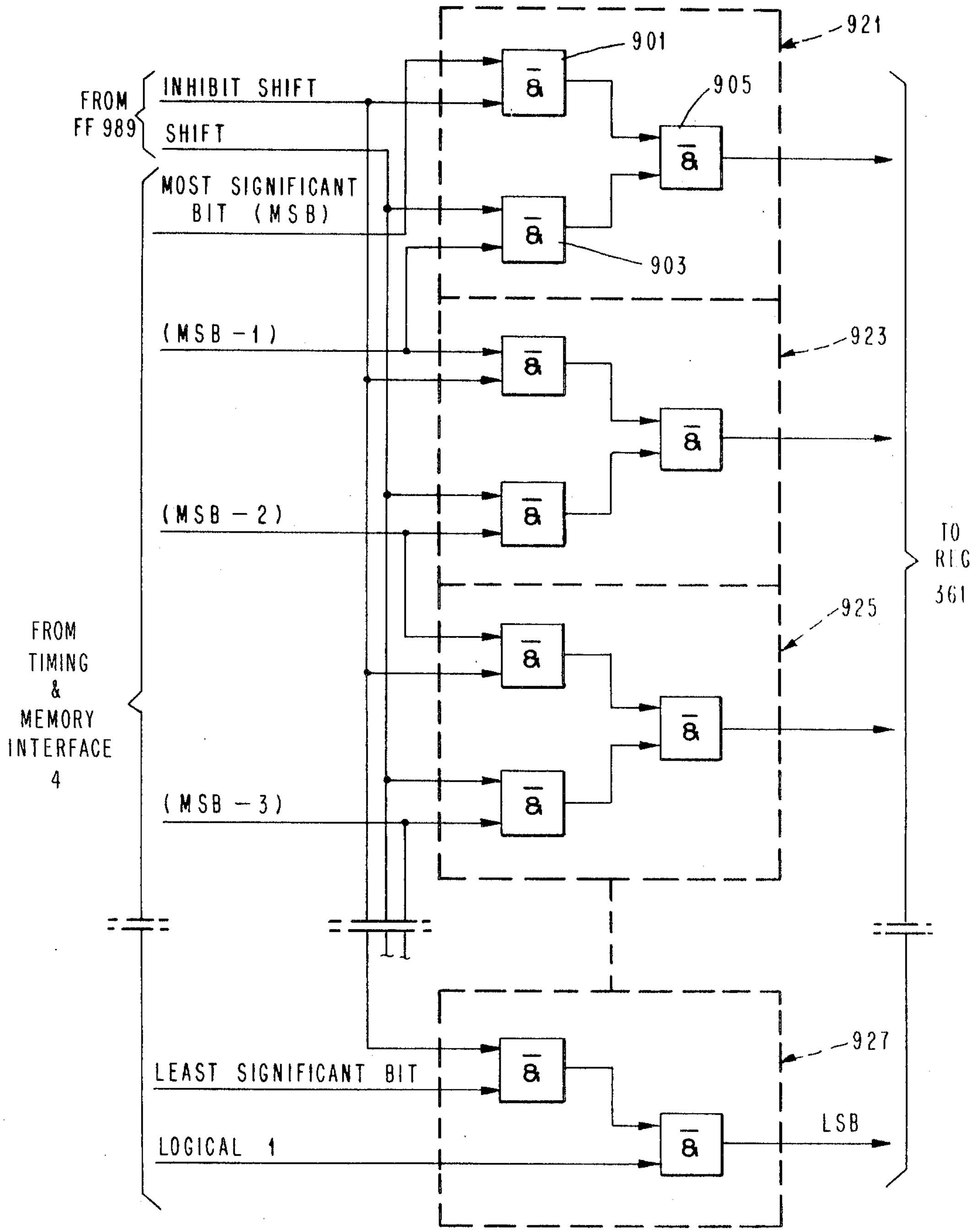
FIG. 10 is the preferred embodiment of either shift control 369, 371, 373, or 374 in FIG. 3.

Referring now to FIG. 10, the preferred embodiments of one of the shift controls 369, 371, 373, and 374 is shown. For example, assume that FIG. 10 is an illustration of shift control 369. The most significant bit of the information destined to be fed into register 361 forms one input of NAND logic 901. The other input of NAND logic 901 is formed by the inhibit shift line from scaling sense logic 375. The second most significant bit (MSB–1) forms one input of NAND logic 903; the other input is formed by the shift line from scaling sense logic 375. The outputs of NAND logics 901 and 903 form the input of NAND logic 905. When an inhibit shift occurs, it is seen that the most significant bit appears as the output of NAND logic 905. However, when the shift line contains a logical one, the output of NAND logic 905 is the second most significant bit.

NAND logics 901, 903, and 905 form bit shifter 921. The number of bit shifters is identical to the number of significant numerical bits contained in register 361. One can easily see how the operation of bit shifter 921 in conjunction with identical bit shifters 923, 925, . . . , 92*n* cause the output of shift control 369 to be either identical to or missing the high order bit of register 361 depending upon whether an inhibit shift or shift, respectively, has occurred.

SCALING SENSE LOGIC AND SHIFT LOGIC—EXAMPLE

Assume that during the first cycle that no one's appeared in the two highest ordered bit positions of the calculated A's and B's. As explained above at the end of the first cycle the lower output of flip-flop 987 will be up. At this time timing pulse 3 will occur and cause counter 995 to step one and energize the lower output of flip-flop 989, the shift line. This output will cause the shift control illustrated in FIG. 5 to shift all the C's and D's drawn from memory during the second cycle (after timing pulse 1) so as to drop the highest order zero. That is, if 00110010111 is drawn from memory, 01100101110 will be placed in the respective register of registers 301, 303, 305, or 307.

It is to be stressed that at the termination of processing the number of high order zeros that have been dropped has been recorded in counter 995. Thus, numerical significance has been maintained while only utilizing significant figures without floating point arithmetic.

While the invention has been particularly shown and described with reference to the preferred embodiments thereof, it will be understood by those skilled in the art that various changes in form and details may be made therein without departing from the spirit and scope of the invention.

What we claim is:

1. In a real time digital Fourier analyzer a digital arithmetic logic device including:

multiplication means for multiplying a first quantity representing a coefficient from a Fourier series and a second quantity exp $(-2\pi j/n)$;

sign determining means for generating the sign of the product of said first and second quantities;

first complementing means, connected to said multiplication means for one's complementing the product of said quantities;

modified complementing means, connected to said sign generating means, for two's complementing a third quantity representing a coefficient from a second Fourier series and adding to it a correction factor for the one's complement of the product of said first and second quantities; and adding means, connected to said first and to said modified complementing means for summing the third quantity and the product of the first and second quantities, producing a sign corrected fourth quantity representing a coefficient of a third Fourier series.

2. In a real time digital Fourier analyzer a digital arithmetic logic device which during each step of each cycle of the calculation multiplies together a coefficient from a first Fourier series and a system constant exp$(-2\pi j/n)$ and produces a coefficient of a third series including:

multiplication means for multiplying the real and imaginary part of a first quantity representing a coefficient from a Fourier series and a second quantity exp$(-2\pi j/n)$;

sign generating means for generating the sign of the product of said first and second quantities;

first complementing means, connected to said multiplication means, for one's complementing the products of said quantities;

modified complementing means, connected to said sign generating means, for two's complementing the real and imaginary parts of a third quantity representing a coefficient from a second Fourier series and adding to it a correction factor for the one's complement of the produce of said first and second quantities;

first adding means, connected to said first and to said modified complementing means, summing the real and imaginary parts of a third quantity and the products of the first and second quantities producing the real and imaginary parts of fourth and fifth quantities representing the coefficients of the third Fourier series.

3. A digital arithmetic logic device as in claim 2 including:

memory means supplying said first and second quantities to said multiplication means and said third quantity to said modified complementing means during each step of each cycle and storing the outputs of said first adding means, said memory means containing at the end of all said cycles, the coefficients of one Fourier series.

4. In a real time digital Fourier analyzer, an address generator wherein during each cycle of the calculation and each step within each cycle the addresses to which and from where a quantity is to be withdrawn and placed are specified including:

first counter means indicating the step in the cycle at which the calculation is at and indicating a completion of a cycle by accumulating a specified number of steps;

series counting means indicating the number of Fourier series existing at the end of that cycle;

an address specifying means connected to said first computer means and being responsive to said indication of a completion of a cycle, and further connected to said series counting means for generating said addresses by producing a first address and a second address, said second address being equal to the sum of said first address and a quantity stored in said series counter.

5. A real time digital Fourier analyzer which during each step of each cycle of the calculation forms from two coefficients of separate Fourier series a coefficient of a third series including:

a digital arithmetic unit including:

multiplication means multiplying the real and imaginary parts of a first quantity representing a coefficient from a Fourier series, and second quantity representing a system constant $\exp(-2\pi j/n)$;

sign determining means for generating the sign of the products of said first and second quantities;

first complementing means, for one's complementing the products of said quantities;

modified complementing means, connected to said sign determining means for two's complementing the real and imaginary parts of a third quantity representing a coefficient from a second Fourier series and adding to it a correction factor for the one's complement of the product of said first and second quantities;

first adding means, connected to said first and modified complementing means, summing the real and imaginary parts of said third quantity and the products of the first and second quantities, producing the real and imaginary parts of fourth and fifth quantities representing the coefficients of the third Fourier series;

memory means connected to said multiplication means to said sign determining means, to said modified complementing means, and to said first adding means for supplying said first and second quantities to said multiplication means and said third quantity to said modified complementing means during each step of each cycle and storing the outputs of said first adding means, said memory means containing at the end of all said cycles the coefficients of one Fourier series; and address generator means specifying during each step of each cycle the addresses to which and from where a quantity is to be withdrawn from and placed in said memory means including:

first counter means indicating the step in the cycle at which the calculation is at and indicating a completion of a cycle by accumulating a specified number of steps series counting means connected to said first counter means indicating the number of Fourier series existing at the end of cycle;

an address specifying means connected to said memory means and being responsive to said first counter means for receiving said indication of a completion of a cycle, means for generating said addresses by producing a first address and a second address, said second address being equal to the sum of said first address and a quantity stored in said series counter.

6. A digital arithmetic logic device as in claim 3 wherein said multiplication means include:

first multiplication means multiplying the first quantity times increasing integer values forming a series of partial products;

selection logic means, connected to said first multiplication means, choosing selected partial products according to numerical value of said second quantity;

a second multiplication means, connected to said selection logic, producing the products of the real and imaginary parts of its first two quantities by combining the selected partial products of the first quantities multiplied by the appropriate powers of two.

7. A digital arithmetic logic device as in claim 5 wherein said multiplication means include:

first multiplication means multiplying the first quantity times increasing integer values forming a series of partial products;

selection logic means, connected to said first multiplication means, choosing selected partial products according to numerical value of said second quantity;

a second multiplication means, connected to said selection logic, producing the products of the real and imaginary parts of its first two quantities by combining the selected partial products of the first quantities multiplied by the appropriate power of two.

8. A digital arithmetic logic device as in claim 3 including:

third complementing means, whose input is connected to said first adding means and whose output is connected to said memory means, two's complementing the final sums and producing a sign corrected sum.

9. A digital arithmetic logic device as in claim 5 including:

third complementing means, whose input is connected to said first adding means and whose output is connected to said memory means, two's complementing the final sums and producing a sign corrected sum.

10. A digital arithmetic logic device as in claim 8 including:

sense logic means, connected to said third complementing means, indicating whether there is any leading one's in the two highest order bit position in the corrected sums;

shift control means, connected to said multiplication means and said sense logic, shifting all said second and third quantities removed from said memory means during a cycle one bit to the left if said sense logic did not detect a leading one in the previous cycle; and a counter registering the number of multiplication cycles in which said shifting occurs and, thereby, indicating the correct order of magnitude of the final calculations.

11. A digital arithmetic logic device as in claim 9 including:

sense logic means, connected to said third complementing means indicating whether there is any leading one's in the two highest order bit position in the corrected sums;

shift control means, connected to said multiplication means and said sense logic, shifting all said second and third quantities removed from said memory means during a cycle one bit to the left if said sense logic did not detect a leading one in in the previous cycle; and a counter registering the number of multiplication cycles in which said shifting occurs and, thereby, indicating the correct order of magnitude of the final calculations.

12. An address generator as in claim 4 wherein said series counting means includes:

shift register means shifting when said first counter means indicates that a cycle has been completed;

second counter means increasing once in value stored for each step; and comparator means connected to said shift register means and to said counter means for comparing the contents read as a binary number of all but the most significant bit in said shift register means with the number stored in said counter means, and producing an output upon a comparison, said output causing said second counter means to be reset to zero.

13. An address generator as in claim 5 wherein said series counting means includes:

shift register means shifting when said first counter means indicates that a cycle has been completed;

second counter means increasing once in value stored for each step; and comparator means connected to said shift register means and to said counter means for comparing the contents read as a binary number of all but the most significant bit in said shift register means with the number stored in said counter means, and producing an output upon a comparison, said output causing said second counter means to be reset to zero.

14. An address generator as in claim 12 specifying the addresses for a D–L algorithm wherein said address specifying means includes:

third counter means increasing once in value stored for each step of the calculation and returning to zero when said first counter means indicates an end of a cycle;

second adding means connected to said third counter means for summing the contents of said shift register means read as a binary number with the contents of said second counter means; and gate means connected to said second adding means and said third counter means for replacing the contents of said third counter means with the contents of said second adder means when said comparator means produces an output;

the contents of said third counter means supplying the address of said third quantity and the sum produced by said second adder means representing the address of said second quantity.

15. An address generator as in claim 13 specifying the addresses for a D–L algorithm wherein said address specifying means includes:

third counter means increasing once in value stored for each step of the calculation and returning to zero when said first counter means indicates an end of a cycle;

second adding means connected to said third counter means for summing the contents of said shift register means read as a binary number with the contents of said counter means; and gate means connected to said second adding means and said third counter means for replacing the contents of said third counter means with the contents of said second adder means when said comparator means produces an output;

the contents of said third counter means supplying the address of said third quantity and the sum produced by said second adder means representing the address of said second quantity.

16. An address generator as in claim 12 including: 1 register means whose contents are cleared when said first counter means indicates an end of a cycle;

third adding means connected to said shift register means and to said register summing all the contents of said shift register means except for the highest order bit read as a binary number and the contents of said register means;

second gate means connected to said third adding means and to said register means for replacing the contents of said register means with the sum produced by said third adding means when said comparator means produces an output; and crossover means connected to said register means and producing as its output the contents of said register means in reverse order, said output representing the address of said first quantity.

17. An address generator as in claim 13 including:

register means whose contents are cleared when said first counter means indicates an end of a cycle;

third adding means connected to said shift register means and to said register means summing all the contents of said shift register means except for the highest order bit read as a binary number and the contents of said register means;

second gate means connected to said third adding means and to said register means for replacing the contents of said register means with the sum produced by said third adding means when said comparator means produces an output; and crossover means connected to said register means and producing as its output the contents of said register means in reverse order, said output representing the address of said first quantity.

18. An address generator as in claim 12 but specifying the ddresses for a C–T algorithm wherein said address specifying means includes:

third counter means increasing once in value stored for each step of the calculation and returning to zero when said first counter means indicates an end of a cycle;

second adding means summing the contents of said shift register means read as a binary number with the contents of said second counter means; and gate means replacing the contents of said second counter means with the contents of said second adder means when said comparator means produces an output;

the contents of said third counter means supplying the address of said third quantity and the sum produced by said second adder means representing the address of said second quantity and the contents of said first counter means indicating the address of the fourth quantity and output of said third adding means specifying said fifth address.

19. An address generator as in claim 13 but specifying the addresses for a C–T algorithm wherein said address specifying means includes:

third counter means increasing once in value stored for each step of the calculation and returning to zero when said first counter means indicates an end of a cycle;

second adding means summing the contents of said shift register means read as a binary number with the contents of said second counter means; and gate means replacing the contents of said second counter means with the contents of said second adder means when said comparator means produces an output;

the contents of said third counter means supplying the address of said third quantity and the sum produced by said second adder means representing the address of said second quantity and the contents of said first counter means indicating the address of the fourth quantity and output of said third adding means specifying said fifth address.

20. An address generator as in claim 12 including:

register means whose contents are cleared when said first counter means indicates an end of a cycle;

third adding means summing all the contents of said shift register means except for the highest order bit read as a binary number and the contents of said register means;

second gate means replacing the contents of said register means with the sum produced by said second adder means when said comparator means produces an output, the output of said register means representing the address of said first quantity.

21. An address generator as in claim 13 including:

register means whose contents are cleared when said first counter means indicates an end of a cycle;

third adding means summing all the contents of said shift register means except for the highest order bit read as a binary number and the contents of said register means;

second gate means replacing the contents of said register means with the sum produced by said second adder means when said comparator means produces an output, the output of said register means representing the address of said first quantity.

22. An address generator as in claim 14 including:

register means whose contents are cleared when said first counter means indicates an end of a cycle;

third adding means summing all the contents of said shift register means except for the highest order bit read as a binary number and the contents of said register means;

second gate means replacing the contents of said register means with the sum produced by said second adder means when said comparator means produces an output; and crossover means connected to said register means and producing as its output the contents of said register means in reverse order, said output representing the address of said first quantity.

23. An address generator as in claim 15 including:

register means whose contents are cleared when said first counter means indicates an end of a cycle;

third adding means summing all the contents of said shift register means except for the highest order bit read as a binary number and the contents of said register means;

second gate means replacing the contents of said register means with the sum produced by said second adder means when said comparator means produces an output; and crossover means connected to said register means and producing as its output the contents of said register means in reverse order, said output representing the address of said first quantity.

24. An address generator as in claim 14 including:

register means whose contents are cleared when said first counter means indicates an end of a cycle;

third adding means summing all the contents of said shift register means except for the highest order bit read as a binary number and the contents of said register means;

second gate means replacing the contents of said register means with the sum produced by said second adder means when said comparator means produces an output, the output of said register means representing the address of said first quantity.

25. An address generator as in claim 15 including:

register means whose contents are cleared when said first counter means indicates an end of a cycle;

third adding means summing all the contents of said shift register means except for the highest order bit read as a binary number and the contents of said register means;

second gate means replacing the contents of said register means with the sum produced by said second adder means when said comparator means produces an output, the output of said register means representing the address of said first quantity.

UNITED STATES PATENT OFFICE
CERTIFICATE OF CORRECTION

Patent No. 3,591,784 Dated July 6, 1971

Inventor(s) J.T. Cutter, D.G. Freeman, R. Van Blerkom

It is certified that error appears in the above-identified patent and that said Letters Patent are hereby corrected as shown below:

Col. 2, line 22, after "each:" insert before "$_r$" --$B^1$--, so that it may read --$B^1{}_r$--.

Col. 4, line 4, the equation "$W_k=W_{k1n/2}$," should read as --$W_k=W_{k-n/2}$,--.

Col. 7, line 49, the equation "$_{k1n/2})$." should read as --$_{k-n/2})$.--.

Col. 13, lines 1 and 2, the word "computer" should be read as --counter--.

Col. 15, line 26, the phrase "contents of said counter means;" should read --contents of said second counter means--.

Col. 15, line 37, delete the "1" at the end of the line.

Signed and sealed this 13th day of June 1972.

(SEAL)
Attest:

| | |
|---|---|
| **EDWARD M.FLETCHER,JR.** | **ROBERT GOTTSCHALK** |
| **Attesting Officer** | **Commissioner of Patents** |